(12) United States Patent
Overton et al.

(10) Patent No.: US 7,094,381 B1
(45) Date of Patent: Aug. 22, 2006

(54) DEVICE FOR DESTROYING MICROBES IN A FLUID

(76) Inventors: James Michael Overton, 1127 Nickel La., Yuba City, CA (US) 95991; Robert Smythe, 14824 Fern Rd., Whitmore, CA (US) 96096

( * ) Notice: Subject to any disclaimer, the term of this patent is extended or adjusted under 35 U.S.C. 154(b) by 521 days.

(21) Appl. No.: 10/337,790

(22) Filed: Jan. 8, 2003

(51) Int. Cl.
*B01J 19/08* (2006.01)
*B03C 5/02* (2006.01)

(52) U.S. Cl. ................. 422/186.01; 422/186.04; 204/660; 204/666; 204/672

(58) Field of Classification Search ........... 422/186.03, 422/186.04; 204/660, 666, 672
See application file for complete search history.

(56) References Cited

U.S. PATENT DOCUMENTS

| 5,575,974 A | 11/1996 | Wurzburger et al. |
| 5,756,051 A | 5/1998 | Overton et al. |

*Primary Examiner*—Kishor Mayekar
(74) *Attorney, Agent, or Firm*—Theodore J. Bielen, Jr.

(57) ABSTRACT

A device for destroying microbes in a fluid medium utilizing a housing. The housing possesses an exterior and a fluid passageway formed by an inner wall portion. The housing also includes a plurality of chambers positioned radially outwardly from the fluid passageway. The chambers and enclose magnets which surround the passageway. First and second electrodes extend along the fluid passageway and lie flush with the inner wall portion. The electrodes include terminals that are available on the exterior of the housing to receive power from a source.

8 Claims, 4 Drawing Sheets

DEVICE FOR DESTROYING MICROBES IN A FLUID

BACKGROUND OF THE INVENTION

The present invention relates to a novel and useful device for destroying microbes in a fluid medium.

The availability of potable water presents a daunting problem worldwide. That is to say, the availability of potable water worldwide is relatively scarce in comparison to total amount of water found on the planet. Many potable fresh water sources become unusable due to contamination by microbes such as bacterias, and other pathogens.

Normal chemical treatments of water employed to eliminate microbes has been successful in many cases. However, persistent problems remain after chemical treatment of contaminated water. For example, chemically treated water tends to form compounds that are deemed to be dangerous such as chlorinated hydrocarbons. In addition, chlorine may not eliminate certain pathogens since the traditional level of chlorine treatment in water is often not sufficient to kill certain microbes. Increasing the dosage of chlorine in water also results in water having an unpleasant smell and taste.

Many systems have been proposed for the treatment of water without chemical additives. For example, U.S. Pat. Nos. 5,575,974 and 5,756,051 show systems which employ the combination of electric fields and magnetic fields in a continuous flow system. Although successful in treating water, such systems are cumbersome and complex in structure, resulting in manufacturing expenses which are prohibitive.

A device for destroying microbes in a fluid medium would be a notable advance in the liquid purification field.

BRIEF SUMMARY OF THE INVENTION

In accordance with the present invention a novel and useful device for destroying microbes in a fluid medium is herein described.

The device of the present invention utilizes a housing which possesses an exterior and a fluid passageway formed by an inner wall portion. The fluid passageway includes an inlet and an outlet to the same. In addition, the housing is formed with a plurality of chambers positioned radially outwardly from the fluid passageway. The housing may be connected to entry and exit conduits which carry fluid such as water to and from the device of the present invention.

First and second electrodes are formed to extend along the fluid passageway and to each lie flush with the inner wall portion of the fluid passageway. Each electrode may be constructed with a first and second portion separated from one another and connected by intermediate portion which lies below the wall portion of the fluid passageway. In this embodiment, the first portions of the first and second electrode, and the second portions of the first and second electrode lie opposite one another. Such arrangement, results in the first and second electrodes forming a multiplicity of distinct zones which are used to destroy microbes as they flow through the fluid passageway of the device of the present invention.

A plurality of magnets are placed in each of the plurality of chambers which surround the electrodes. Such chambers may be left in an open condition or sealed once the device of the present invention is manufactured for use. In any case, the plurality of the magnets produce a magnetic field which confines the electrical field of the electrodes to the fluid passageway to maximize the purifying characteristics of the electrodes formed within the housing.

A source of electrical power is also found in the present invention. The source of electrical power is preferably a DC power source derived from a battery, or an alternating current source which has been rectified. The source of electrical power may be placed in a support in conjunction with the housing. The housing would then be constructed with mounting means for holding the electrical power support to the housing. The first and second electrodes further possess terminals which extend through the housing and are available for connection on the exterior of the housing to the source of electrical power. The electrical power support may be removably fixed to the housing in order to maintain and replace and batteries or electrical components which are found in the support.

The source of electrical power is also connected to switch means which activates the electrodes and is capable of reversing the plurality of the electrodes with each on-off cycle. In this manner, microbe destruction is maximized within the device of the present invention.

It may be apparent that a novel and useful device for destroying microbes in a fluid medium has been hereinabove described.

It is therefore an object of the present invention to provide a device for destroying microbes in a fluid medium which is simple and inexpensive to manufacture.

Another object of the present invention is to provide a device for destroying microbes in a fluid medium which is compact and easily transportable for use in remote areas.

A further object of the present invention is to provide a device for destroying microbes in a fluid medium which includes electrodes that produce multiple zones in a fluid passageway for destroying microbes in a continuous manner.

A further object of the present invention is to provide a device for destroying microbes in a fluid mechanism which provides a continuous flow of contaminated fluid for purification by the device of the present invention with minimum impediments to flow.

Another object of the present invention is to provide a device for destroying microbes in a fluid medium which operates at high pressure and does not produce notable cavitation during passage of fluid through the device.

The invention possesses other objects and advantages especially as concerns particular characteristics and features thereof which will become apparent as the specification continues.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior noted drawings.

Figure 1:
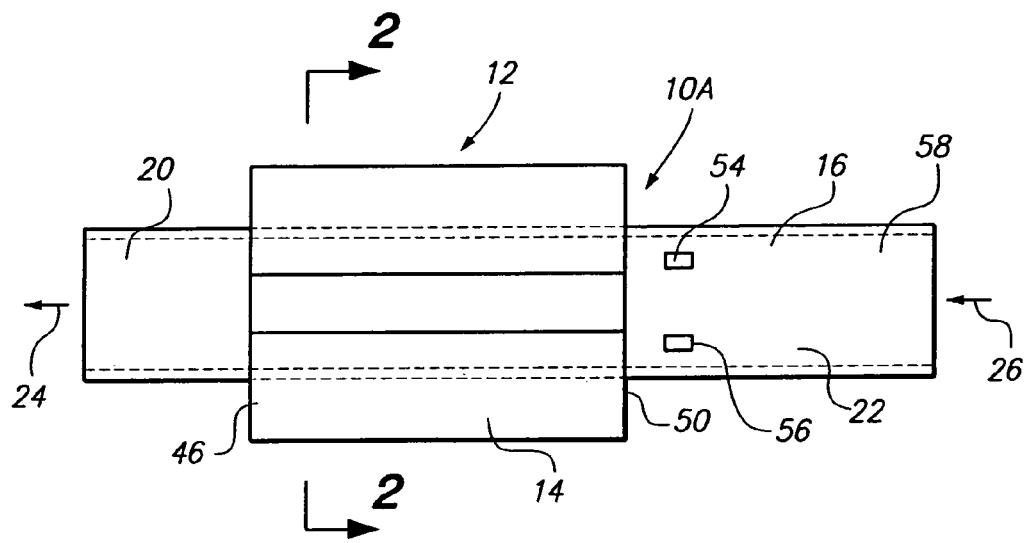
FIG. 1 is a side elevational view of an embodiment of the present invention.
Figure 2:
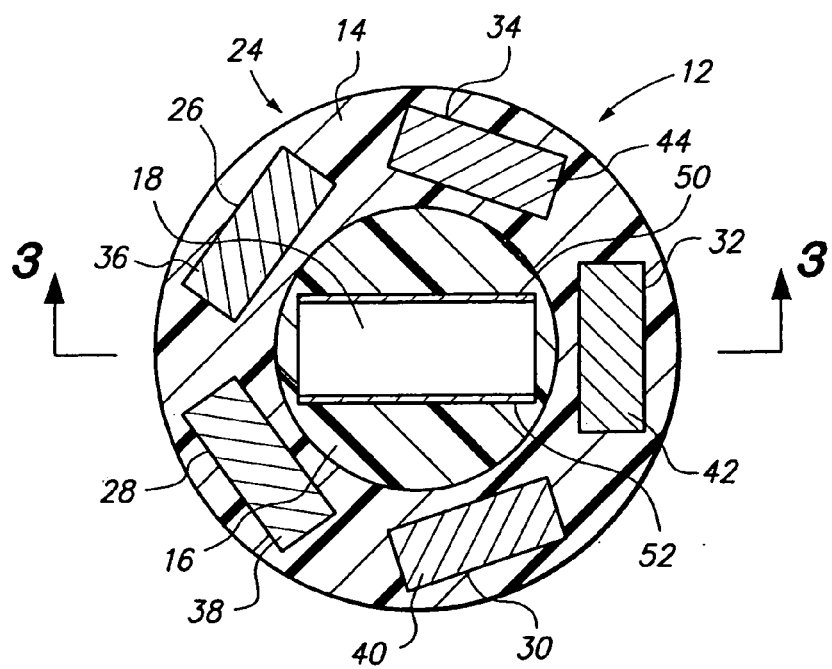
FIG. 2 is a sectional view taken along line 2—2 of FIG. 1.

The preferred embodiments of the present invention are shown in the drawings by reference character 10 followed by an uppercase letter to denote variations of the same. With reference to FIG. 1, it should be seen that device 10A is depicted. Device 10A includes a housing 12. With reference to FIGS. 1 and 2, it may be observed that housing 12 includes an outer annular member 14 and an inner cylindrical member 16. Outer annular member 14 and inner cylindrical member 16 may be formed separately and connected by any suitable means such as gluing, fusing, sonic welding, employment of fasteners, and the like. Also, housing 12 may be molded or cast as a unitary member. As depicted in the drawings, housing 12 is formed of a plastic material such as ABS. However, other polymeric materials such as polypropylene, polyethylene and the like, may be employed in this regard.

With further reference to FIG. 2, it may be observed that inner cylindrical member 16 includes a passageway 18 of rectangular cross-sectional configuration. Passageway 18 is intended to serve as a conduit for fluids being purified by device 10. Inner cylindrical member 16 also possesses extensions 20 and 22 which project from outer annular member 14. Extensions 20 and 22 may be employed as connections to conduits directing fluids such as microbe containing water, through and away from passageway 18, directional arrows 24 and 26. That is to say, since the preferred embodiments of the present invention indicates that plastic material is used for housing 12, plastic type conduit may be adhered to extensions 20 and 22 in a conventional manner by the use of adhesives.

With reference again to FIGS. 1 and 2, it may be apparent that housing outer annular member 14 is formed with a plurality of chambers 24, notably chambers 26, 28, 30, 32, and 34. Each of the plurality of chambers 24 is occupied by a permanent magnet. For example, FIG. 2 illustrates the use of permanent magnets 36, 38, 40, 42, and 44. Permanent magnets 36, 38, 40, 42, and 44 are typically arranged in similar polarity about passageway 18, and extend along the length of passageway 13 between ends 46 and 50 of outer annular member 14. That is to say, all the north or south poles of each magnet are oriented to face chamber 18. Plurality of chambers 24 may remain open or be sealed once permanent magnets 36, 38, 40, 42, and 44 are placed therewithin.

Figure 3:
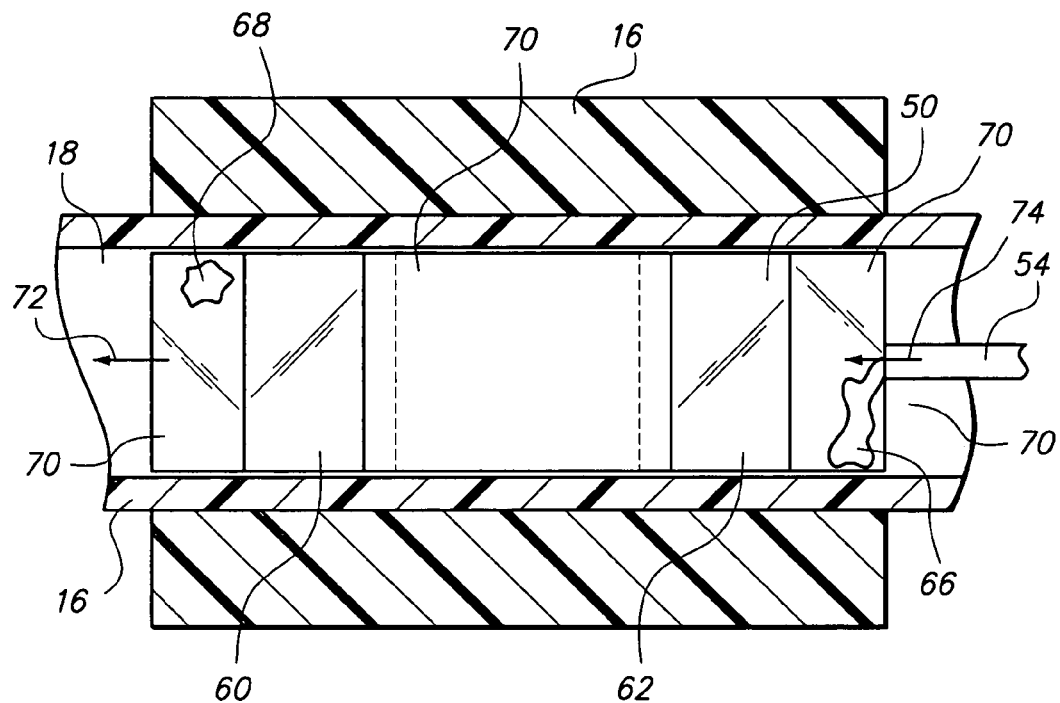
FIG. 3 is a sectional view taken along line 3—3 of FIG. 2.

Device 10 is also formed with a first electrode 50 and a second electrode 52. First electrode 50 lies opposite second electrode 52 within passageway 18. Terminals 54 and 56 electrically link to electrodes 50 and 52, respectively, and extend to the exterior surface 58 of extension 22. With reference to FIG. 3, it may be observed that first electrode 50 is revealed within passageway 18. It should be understood that the structure of first electrode 50 is the same structure pertaining to second electrode 52 on the opposite side of passageway 18. In this regard, first electrode 50 includes surface plates 60 and 62, which lie flush with surface 70 connected by intermediate portion 64. Ends 66 and 68, as well as intermediate portion 64 of electrode 50 are embedded or lie below surface 70 of inner cylindrical member 16 forming passageway 18.

Figure 4:
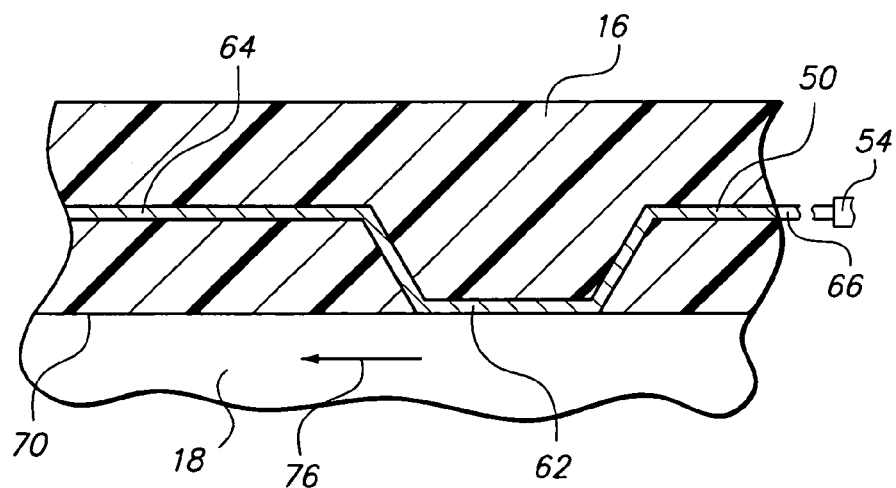
FIG. 4 is an enlarged sectional view depicting a portion of the first electrode within the housing of the device of the present invention.

Consequently, multiple zones are formed by electrodes 50 and 52 within passageway 18 for killing or destroying microbes passing through passageway 18, directional arrows 72 and 74 of FIG. 3 and directional arrow 76 of FIG. 4. Of course, end 66 of electrode 50 extends through inner cylindrical member 16 to terminal 54. It should be noted that terminals 54 and 56 connect to a source of power 78, FIG. 7 which will be discussed hereinafter.

Figure 5:
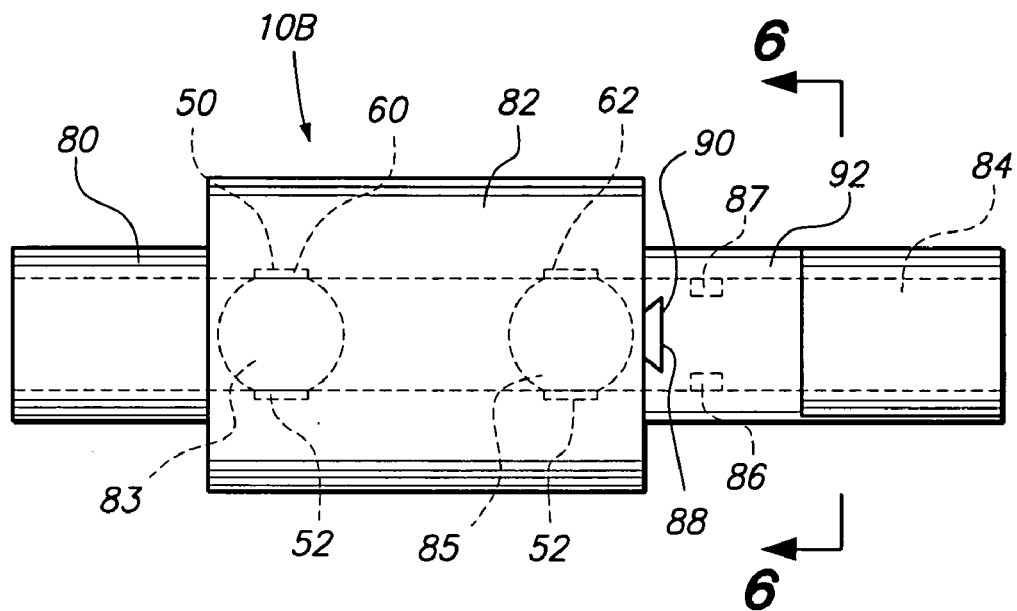
FIG. 5 is a side elevational view of another embodiment of the present invention.
Figure 6:
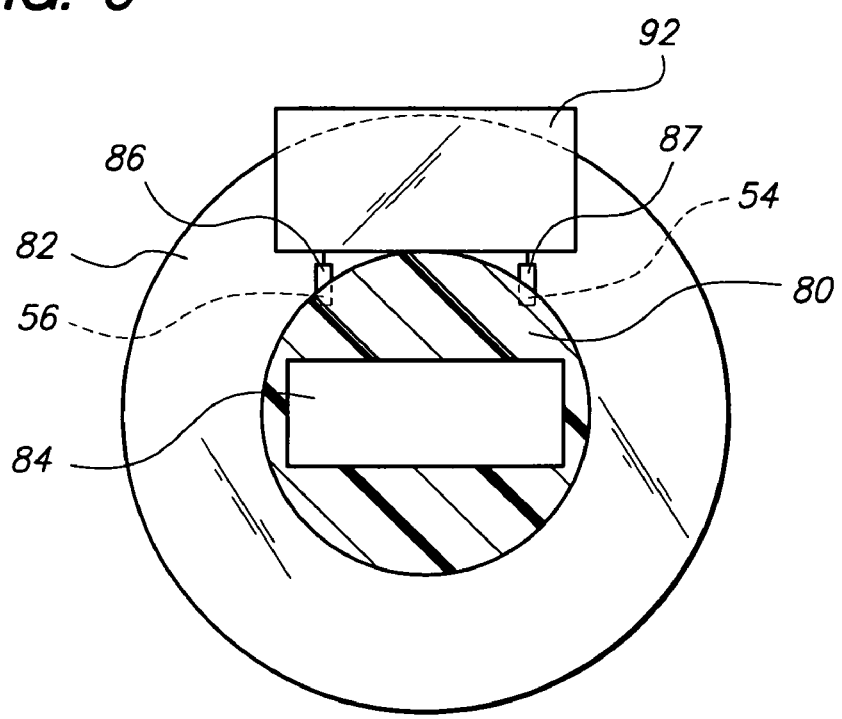
FIG. 6 is a sectional view taken along line 6—6 of FIG. 5.

Referring now to FIG. 5, it may be observed that second embodiment 10B of the present invention is portrayed. Embodiment 10B uses an inner cylindrical member 80 which is similar to inner cylindrical member 16. Inner cylindrical member 80 is fused or fastened to outer annular member 82 in the same manner as annular member 14 and inner cylindrical member 16 are connected. Of course, inner cylindrical member 80 includes a passageway 84 and electrodes similar to electrodes 50 and 52. Zones 83 and 85 are illustrated in phantom on FIG. 5 to indicate the location of the opposing portions of electrodes 50 and 52 in passageway 84. In addition, outer annular member 82 possesses a plurality of permanent magnets arranged in a similar manner to magnets 36, 38, 40, 42, and 44, hereinabove described with respect to annular member 14. Terminals 86 and 87 electrically link to the electrodes 50 and 52 found in passageway 84, via terminals 54 and 56, FIG. 1. Outer annular member 82 is formed with a tenon 88 which links to mortis 90 constructed into battery and switching pack 92. Thus, battery and switching pack 92 may slide into the position shown in FIGS. 5 and 6 and be removed therefrom in order to service the internal components of pack 92, such as the batteries. Needless to say, an electrical connection is achieved between terminals 86 and 87 and source of power 78 located within battery pack 92.

Figure 7:
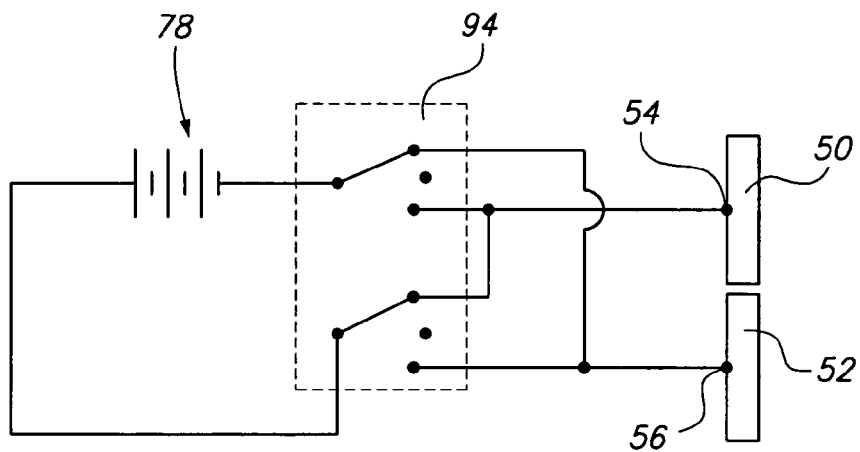
FIG. 7 is an electrical schematic depicting the switching means associated with the device of the present invention and polarity reversal of the electrodes used in the system of the present invention.

Viewing now FIG. 7, it may be observed that source of power 78 may be in the form of a DC electrical source. For example, an electrical DC source of a particular voltage is provided and sent to a switch 94. Switch 94 includes a double throw double pole switch which reverses polarity on electrodes 50 and 52 each time the switch 94 is activated. Of course, source of power source 98 may include an AC power source with a rectifier to produce DC electricity to electrodes 50 and 52 lining passageway 18 of devices 10A or 10B.

Figure 8:
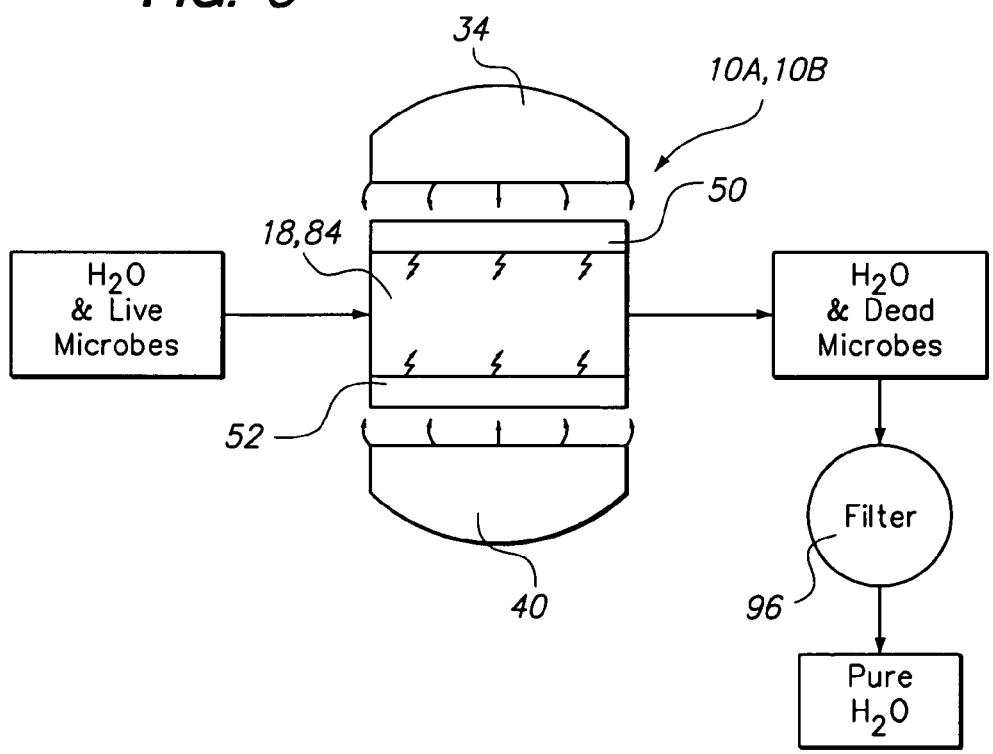
FIG. 8 is a block diagram depicting the process of purifying water used in conjunction with the device of the present invention.

In operation, FIG. 8 represents the process employed with devices 10A or 10B. Extensions 20 and 22 of devices 10 or 10B are connected to conduits delivering contaminated fluid and removing pure fluid such as water to devices 10A or 10B. Such water passes through passageways 18 or 84 of devices 10A or 10B, respectively. Electrodes 50 and 52 within passageways 18 or 84 are activated by power source 78 via switch means 94. In the embodiments depicted in the drawings, two zones 83 and 85 illustrated in FIG. 5 with respect to embodiment 10B are established about the exposed plates of electrodes 50 and 52, represented by plates 60 and 62 of electrode 50, FIG. 3. Zones 83 and 85 define spaces in passageways 18 and 84 where microbes in the moving fluid are sequentially destroyed as the fluid passed through devices 10A or 10B travels according to directional arrows 72, 74, of FIG. 3 and directional arrow 76 of FIG. 4. Fluid, such as water, containing dead microbes is then passed through conduit connecting to devices 10A and 10B. A filter 86 may be employed to remove the physical remains of dead microbes within the water body leaving pure water for use.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device for destroying microbes in a fluid medium, comprising:
   a. a housing, said housing including an exterior and a fluid passageway formed by an inner wall portion, said fluid passageway including an inlet and an outlet thereto, said housing further including a plurality of chambers positioned radially outwardly from said fluid passageway;
   b. a first electrode extending along said fluid passageway, said first electrode having a portion lying flush with said inner wall portion of said fluid passageway, and a portion embedded said housing;
   c. a second electrode extending along said fluid passageway, said second electrode having a portion lying flush with said inner wall portion of said fluid passageway and a portion embedded in said housing, said second electrode lying apart from said first electrode to generate an electric field across said fluid passageway, said fluid passageway being unimpeded by said first and second electrodes;
   d. a plurality of magnets placed in each of said plurality of chambers; and
   e. a source of electrical power, said source of electrically connected to said first and second electrodes.

2. The device of claim 1 in which said fluid passageway lies along an axis.

3. The device of claim 2 in which said fluid passageway is rectangular in cross-sectional configuration.

4. The device of claim 1 in which said fluid passageway chamber includes a predetermined cross-sectional area.

5. The device of claim 1 in which said at least first electrode comprises an angular member, a leg of said angular member comprising said portion of said first electrode being flush with said inner wall portion of said fluid passage way.

6. The device of claim 1 in which said source of electrical power comprises at least one electrical battery located in a support, and said housing further comprises mounting means for holding said support to the housing.

7. The device of claim 1 which additionally comprises switch means for regulating the flow of electrical power to said first and second electrodes and for determining the polarity of each of said electrodes.

8. The device of claim 1 which at least said first electrode portion lying flush with said inner wall portion of said fluid passageway comprises a first portion lying flush with said inner wall portion of said fluid passageway and further comprises a second portion lying flush with said inner wall portion of said fluid passageway, said portion of said first electrode embedded in said housing connecting said first and second portions lying flush with said inner wall portion of said fluid passageway, said first and second portions of said first electrode lying flush with said inner wall portion of said fluid passageway positioned apart from one another.

* * * * *